(12) United States Patent
Inagi et al.

(10) Patent No.: US 12,028,498 B2
(45) Date of Patent: Jul. 2, 2024

(54) GROUP MANAGEMENT DEVICE AND GROUP MANAGEMENT METHOD

(71) Applicant: TOSHIBA TEC KABUSHIKI KAISHA, Tokyo (JP)

(72) Inventors: Tatsuya Inagi, Izu Shizuoka (JP); Shigeki Yamaguchi, Izu Shizuoka (JP); Satoshi Oyama, Mishima Shizuoka (JP); Takumi Fujita, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/952,408

(22) Filed: Sep. 26, 2022

(65) Prior Publication Data

US 2024/0106958 A1 Mar. 28, 2024

(51) Int. Cl.
*G06F 15/00* (2006.01)
*H04N 1/32* (2006.01)

(52) U.S. Cl.
CPC . *H04N 1/32539* (2013.01); *H04N 2201/3202* (2013.01); *H04N 2201/3221* (2013.01)

(58) Field of Classification Search
USPC ........................................................ 358/1.15
See application file for complete search history.

(56) References Cited

U.S. PATENT DOCUMENTS

2011/0316905 A1* 12/2011 Miyazawa ........... B41J 2/17546
347/6
2018/0041647 A1* 2/2018 Sakamoto .......... H04N 1/00034
2019/0354325 A1 11/2019 Sonehara et al.
2020/0041944 A1* 2/2020 Hiraike ................ G03G 15/556
2020/0293242 A1* 9/2020 Fukumura ............. G06F 3/1219
2020/0311662 A1* 10/2020 Banno ................. H04N 1/00084
2022/0171577 A1* 6/2022 Suzuki ................. G06Q 10/083

FOREIGN PATENT DOCUMENTS

JP 2013-182130 9/2013
JP 2017-174323 9/2017

* cited by examiner

*Primary Examiner* — Mark R Milia
(74) *Attorney, Agent, or Firm* — Amin, Turocy & Watson, LLP

(57) ABSTRACT

A group management device includes a required information acquisition unit, a supplement instruction unit, a mounting information acquisition unit, and a group update unit. The required information acquisition unit acquires information showing required groups that are groups determined to require supplements of the consumables used in image forming devices that are managed per group. The supplement instruction unit performs a supplement instruction of the consumables for the required groups. The mounting information acquisition unit acquires mounting information showing the image forming device mounted with the consumable supplemented in response to the supplement instruction. The group update unit specifies a mounting group that is the group to which the image forming device mounted with the consumable belongs based on group correspondence information obtained by associating the image forming device and the group, and the mounting information, and updates the group correspondence information if the required group and the mounting group are different from each other.

16 Claims, 12 Drawing Sheets

FIG. 4
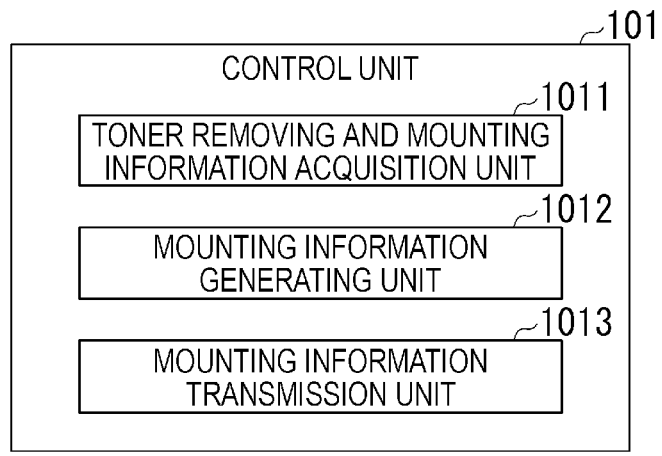
FIG. 5
| MACHINE NUMBER | TONER ID | MOUNTING DATE | REMOVAL DATE |
|---|---|---|---|
| 100-21 | T101000 | 2022-07-14 | NULL |
FIG. 6
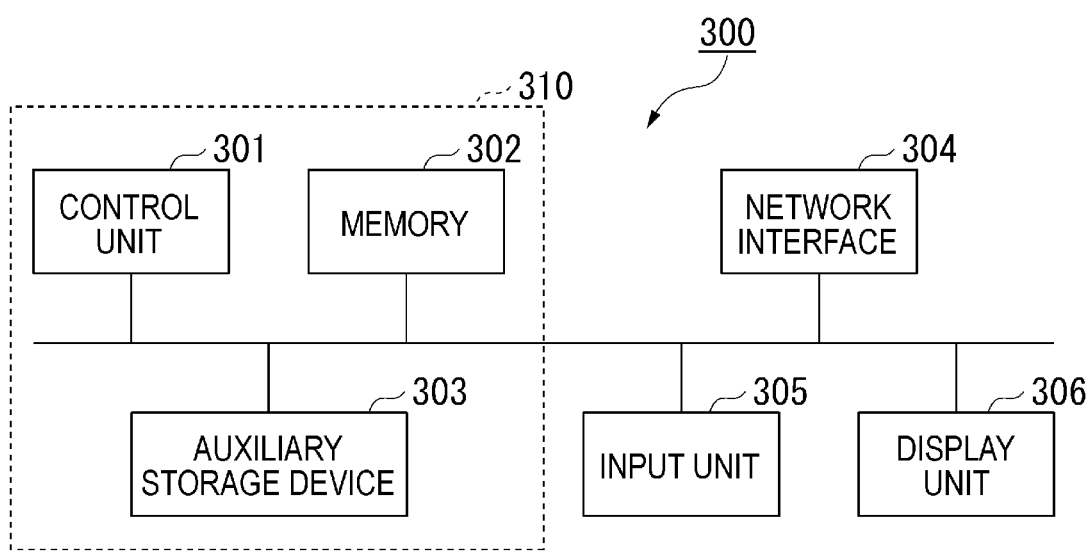

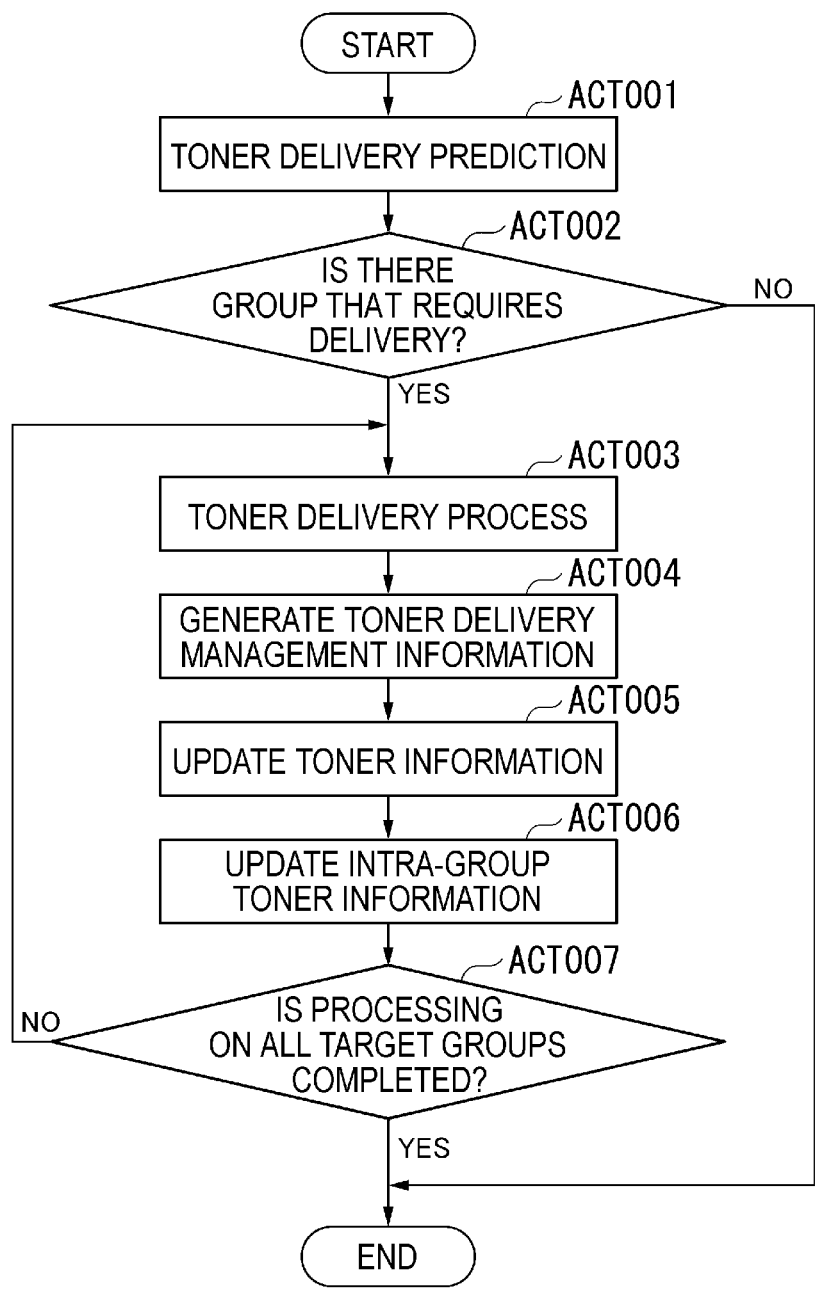

FIG. 10

| MACHINE NUMBER | GROUP ID |
|---|---|
| 100-11 | 1001 |
| 100-12 | 1001 |
| 100-13 | 1001 |
| 100-21 | 1002 |
| 100-22 | 1002 |
| 100-23 | 1002 |
| 100-31 | 1003 |
| 100-32 | 1003 |
| 100-33 | 1003 |

FIG. 11

| DELIVERY MANAGEMENT NUMBER | CLASSIFICATION | REQUEST SOURCE | GROUP ID | STATE |
|---|---|---|---|---|
| 10000 | PREDICTION | NULL | 1001 | DELIVERY COMPLETED |

FIG. 12

| TONER ID | TYPE | COLOR | DELIVERY MANAGEMENT NUMBER |
|---|---|---|---|
| T101000 | A | BLACK | 10000 |

| MACHINE NUMBER | GROUP ID |
|---|---|
| 100-11 | 1001 |
| 100-12 | 1001 |
| 100-13 | 1001 |
| 100-21 | 1002 |
| 100-22 | 1002 |
| 100-23 | 1002 |
| 100-31 | 1003 |
| 100-32 | 1003 |
| 100-33 | 1003 |

| MACHINE NUMBER | GROUP ID |
|---|---|
| 100-11 | 1004 |
| 100-12 | 1004 |
| 100-13 | 1004 |
| 100-21 | 1004 |
| 100-22 | 1004 |
| 100-23 | 1004 |
| 100-31 | 1003 |
| 100-32 | 1003 |
| 100-33 | 1003 |

| GROUP ID | TYPE | COLOR | NUMBER OF UNUSED TONERS |
|---|---|---|---|
| 1001 | A | BLACK | 0 |
| 1002 | A | BLACK | 1 |
| 1003 | A | BLACK | 1 |

| GROUP ID | TYPE | COLOR | NUMBER OF UNUSED TONERS |
|---|---|---|---|
| 1004 | A | BLACK | 0 |
| 1003 | A | BLACK | 1 |

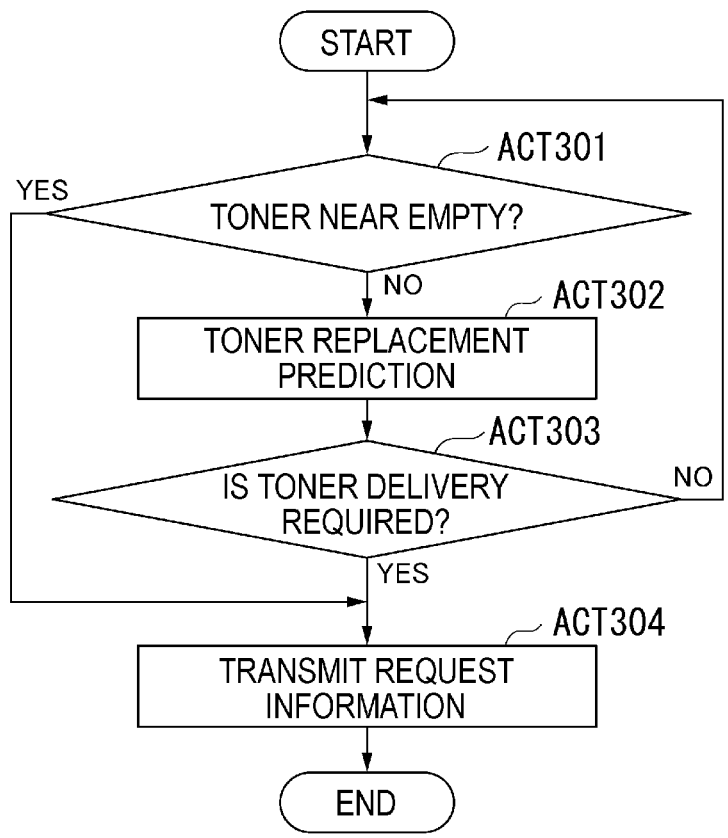

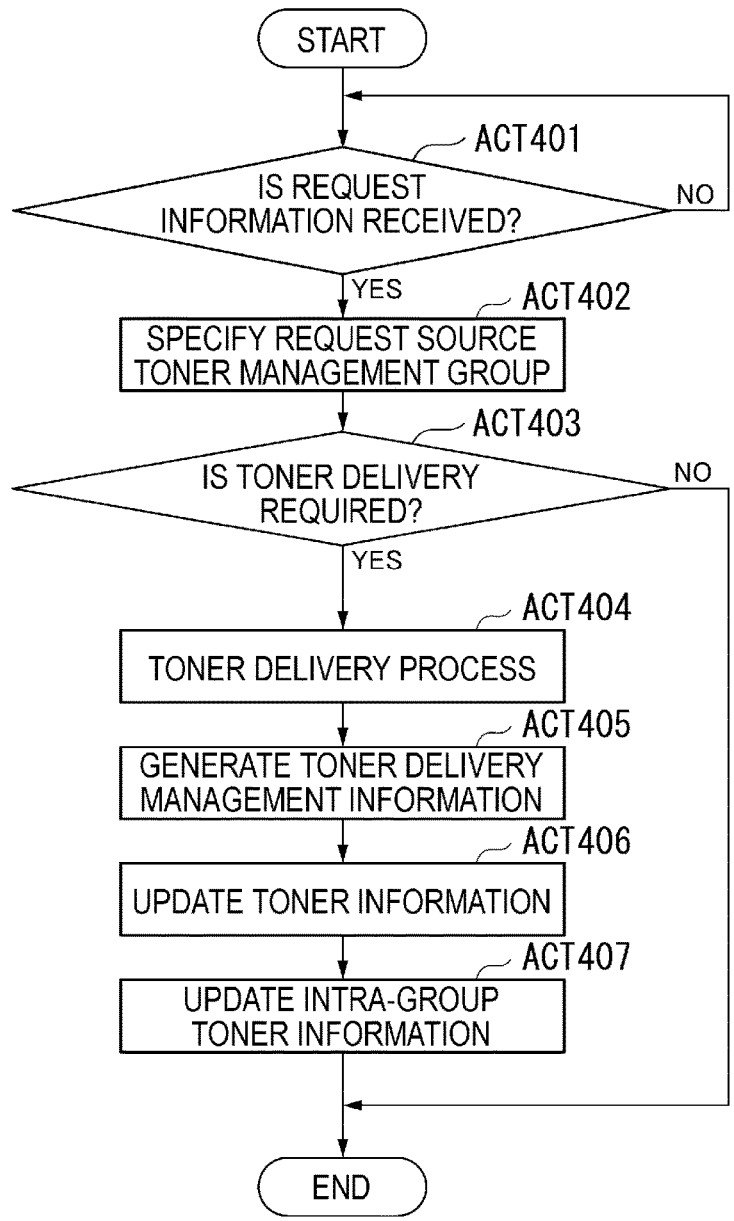

GROUP MANAGEMENT DEVICE AND GROUP MANAGEMENT METHOD

FIELD

Embodiments described herein relate generally to a group management device and a group management method.

BACKGROUND

There is a delivery management system that manages delivery of a toner cartridge used in an image forming device to a user. The image forming device is, for example, a multi-function peripheral (MFP), a copier, or a printer. The toner cartridge is required to be delivered to the user at an appropriate timing. For example, if a new toner cartridge is delivered too early, even though a toner still remains in the toner cartridge in use, the toner cartridge is replaced by the user prematurely. Accordingly, a discarded amount of the toner increases, and thus the toner is wasted. Therefore, as long as the toner in the toner cartridge in use is not dried up, it is preferable that a new toner cartridge is delivered after the remaining amount of the toner becomes small. Hereinafter, drying up of a toner in a toner cartridge in use is referred to as "running out of a toner".

In view of this circumstance, there is a delivery management system that predicts a timing when a new toner cartridge is required to be delivered. Such a delivery management system manages the number of unused toner cartridges in stock which are maintained by the user who manages the image forming device. In addition, such a delivery management system may manage, for example, a usage circumstance of a toner cartridge mounted in the image forming device. Examples of the usage circumstance includes a remaining amount and a usage frequency of the toner in the toner cartridge in use. The delivery management system predicts a timing when a new toner cartridge is required to be delivered based on the number of toner cartridges in stock, the usage circumstance, or the like. The delivery management system determines the necessity of the delivery of a new toner cartridge to the user based on a prediction result.

However, there is a case where a plurality of image forming devices are supplied to a user. If the number of supplied image forming devices is large, the plurality of image forming devices may be divided into some groups (hereinafter, referred to as "toner management groups") and managed. For example, the grouping is performed by combining a plurality of image forming devices disposed at locations close to each other or in the same department into one toner management group. In this case, prediction of a delivery timing of a new toner cartridge and delivery management of a toner cartridge are performed on a per toner management group basis.

However, the toner management group of the image forming device managed in the delivery management system may not match the actual situation. For example, a registration process of the image forming device to a toner management group is performed on a delivery management system but is not performed yet on a system on a user side in some cases. Also, for example, due to rearrangement of equipment on the user side, a plurality of image forming devices belonging to the same toner management group may not necessarily be disposed at locations close to each other.

In such a case, a toner cartridge that is delivered with the intention of being used in a certain toner management group may be accidently mounted to an image forming device belonging to another toner management group. If a toner cartridge is used for an image forming device belonging to a toner management group different from the intended toner management group, it becomes difficult to predict a delivery timing of a new toner cartridge thereafter. Accordingly, there may be a case where an image forming device of which a toner runs out. In addition, such a problem does not only occur in a toner cartridge, but also may occur in other consumables used for an image forming device.

DESCRIPTION OF THE DRAWINGS

FIG. 4 is a block diagram illustrating a functional configuration of a control unit 101;

FIG. 5 is a diagram illustrating an example of mounting information;

FIG. 6 is a diagram illustrating a hardware configuration example of a delivery management device 300;

FIG. 8 is a flowchart showing an example of an operation of the delivery management device 300;

FIG. 9 is a diagram showing a specific example of intra-group toner information;

FIG. 10 is a diagram showing a specific example of toner management group information;

FIG. 11 is a diagram showing a specific example of toner delivery management information;

FIG. 12 is a diagram showing a specific example of toner information;

FIG. 19 is a flowchart showing an example of an operation of an image forming device;

FIG. 20 is a diagram showing an example of request information;

FIG. 21 is a flowchart showing an example of an operation of a delivery management device; and FIG. 22 is a diagram showing a specific example according to toner delivery management information.

DETAILED DESCRIPTION

The present disclosure is to provide a group management device and a group management method that can prevent drying up of consumables used in the image forming device.

In general, according to one embodiment, a group management device includes a required information acquisition unit, a supplement instruction unit, a mounting information acquisition unit, and a group update unit. The required information acquisition unit acquires information showing required groups that are groups determined to require supplements of the consumables used in image forming devices that are managed per group. The supplement instruction unit performs a supplement instruction of the consumables for the required groups. The mounting information acquisition unit acquires mounting information showing the image forming device to which the consumable supplemented in response to the supplement instruction is mounted. The group update unit specifies a mounting group that is the group to which the image forming device mounted with the consumable belongs based on group correspondence information obtained by associating the image forming device and the group, and the mounting information, and updates the group correspondence information if the required group and the mounting group are different from each other.

Hereinafter, a group management device and a group management method according to embodiments are described with reference to the drawings.

Hereinafter, a first embodiment is described.

Figure 1:
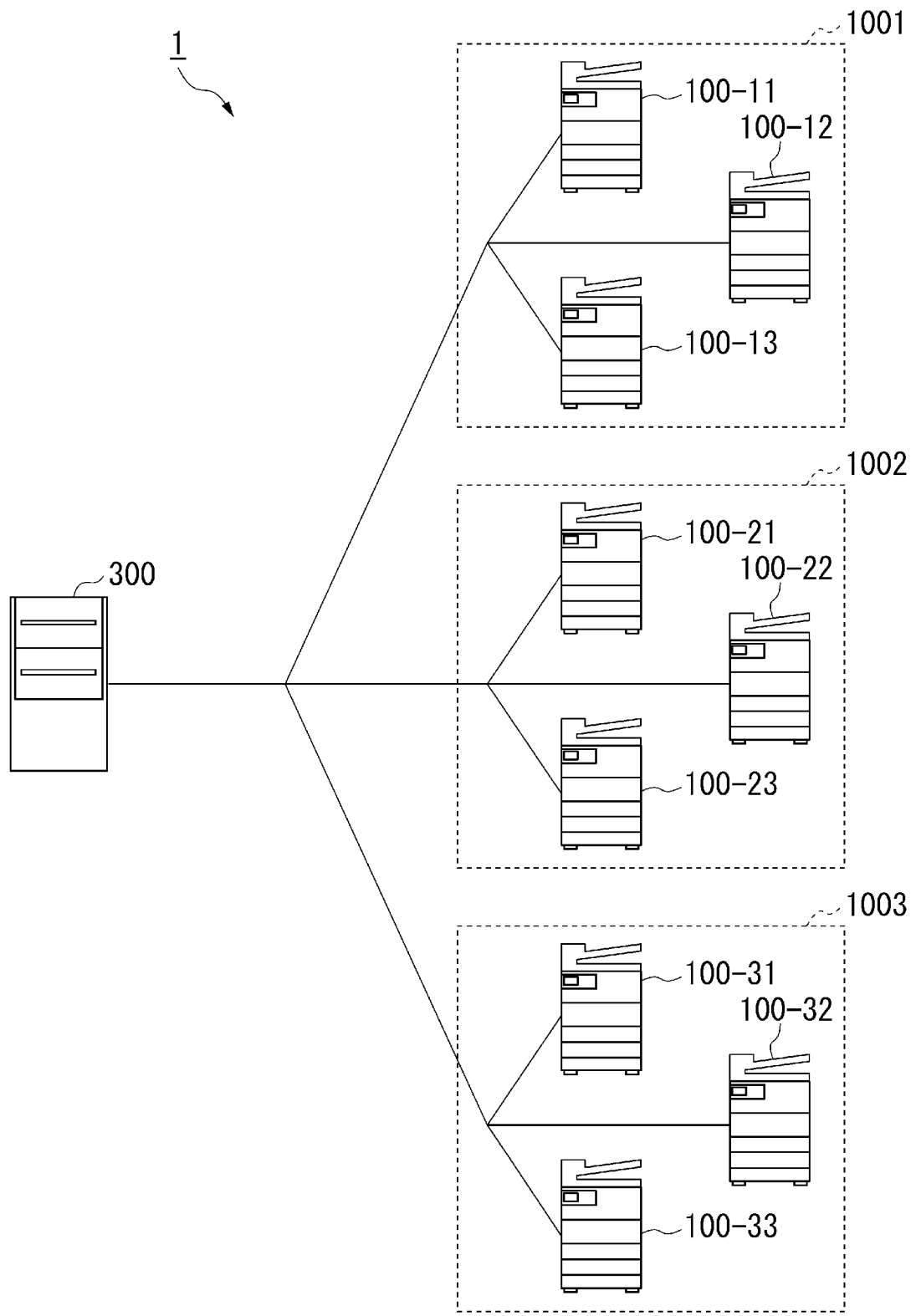
FIG. 1 is a schematic diagram illustrating a specific example of a multi-function peripheral system 1 according to a first embodiment.

FIG. 1 is a schematic diagram illustrating a specific example of a multi-function peripheral system 1 according to the first embodiment. As illustrated in FIG. 1, the multi-function peripheral system 1 includes a plurality of image forming devices 100 and a delivery management device 300.

The image forming device 100 is an MFP. The image forming device 100 may be, for example, another image forming device such as a copier, or a printer. The image forming device 100 is installed, for example, in an office of a user. FIG. 1 illustrates, for example, nine image forming devices 100, which are sequentially denoted by reference numerals of 100-11 to 100-13, 100-21 to 100-23, 100-31 to 100-33. The number of image forming devices 100 may be any number, as long as there are a plurality of image forming devices 100.

The image forming devices 100 are divided into some toner management groups and managed. The delivery management of the toner cartridge used in the image forming devices 100 is performed per toner management group by the delivery management device 300. In FIG. 1, for example, the image forming devices 100-11 to 100-13 belong to a toner management group 1001, the image forming devices 100-21 to 100-23 belong to a toner management group 1002, and the image forming devices 100-31 to 100-33 belong to a toner management group 1003.

The image forming devices 100 each are connected for communication with the delivery management device 300 via a communication line. In addition, as the communication line, for example, any communication lines such as the Internet or a local area network (LAN) can be used. On the communication path between the image forming devices 100 and the delivery management device 300, for example, various communication devices such as a relay device, and a server device on a user side that collectively manages the plurality of image forming devices 100 may be further installed.

Figure 2:
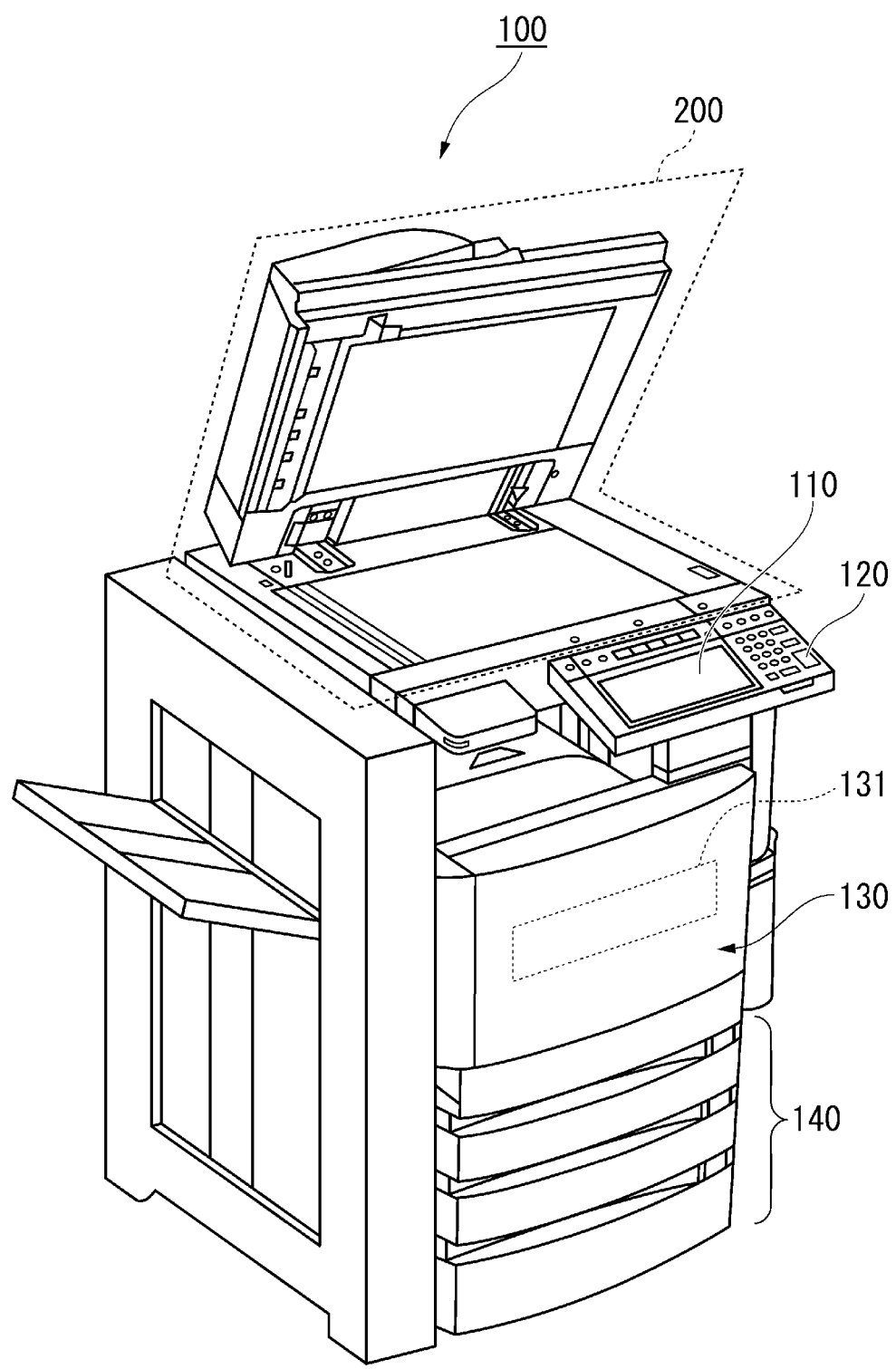
FIG. 2 is an external view illustrating an overall configuration example of an image forming device 100.

Hereinafter, a configuration of the image forming device 100 is described with reference to FIG. 2. FIG. 2 is an external view illustrating an overall configuration example of the image forming device 100. The image forming device 100 according to the first embodiment is an MFP as described above. The image forming device 100 includes a display 110, a control panel 120, a printer unit 130, a sheet containing unit 140, and an image reading unit 200.

The display 110 is, for example, a display device such as a liquid crystal display (LCD) and an organic Electro Luminescence (EL) display. The display 110 displays various kinds of information relating to the image forming device 100 under the control by a control unit 101 described below. The display 110 may be, for example, an input and output device such as a touch panel, which is integrated with the control panel 120 described below.

The control panel 120 is an input device that receives an input operation of the user. The control panel 120 includes, for example, a plurality of input buttons. If the control panel 120 is, for example, a touch panel integrated with the display 110, the input buttons may be an image displayed on the display 110. The control panel 120 outputs an operation signal according to the input operation of the user to the control unit 101.

The printer unit 130 forms an image on a sheet based on image forming data included in an input image data file generated by the image reading unit 200 and copy instruction information. The printer unit 130 may form an image on the sheet based on the image forming data included in the input image data file and print instruction information transmitted from a terminal device 10.

The printer unit 130 may be a device that forms an image by fixing a visible image such as a toner image on a sheet or may be a device that forms an image by an inkjet method. The sheet is, for example, paper or a label sheet. However, the sheet may be any material, as long as the image forming device 100 can form an image on the surface thereof. The sheet may be a sheet that is contained in the sheet containing unit 140 and may be a sheet that is manually inserted into the image forming device 100.

The printer unit 130 includes a toner mounting unit 131. A toner cartridge is mounted on the toner mounting unit 131. The toner mounting unit 131 includes a sensor (not illustrated) that detects the removal and mounting of the toner cartridge. The removal and mounting of a toner cartridge are to mount and remove a toner cartridge. The toner mounting unit 131 includes a reading unit (not illustrated) that reads information relating to the mounted toner cartridge from the corresponding toner cartridge. The toner mounting unit 131 outputs information showing that the toner cartridge is removed and mounted and information relating to the mounted toner cartridge to the control unit 101 described below.

The sheet containing unit 140 contains a sheet used for forming an image by the printer unit 130.

The image reading unit 200 reads an image formed on a document placed on a document table based on brightness and darkness of light and generates image forming data that is digital data. The image reading unit 200 outputs the generated image forming data to the control unit 101. The control unit 101 generates an input image data file including the input image forming data and stores the input image data file in an auxiliary storage device 103 described below. In addition, the control unit 101 may output the input image data file to an external storage device or an external storage medium, for example, via the network. Also, the control unit 101 may output the input image data file to the printer unit 130 as it is, without storing the input image data file in the storage device or the like.

Figure 3:
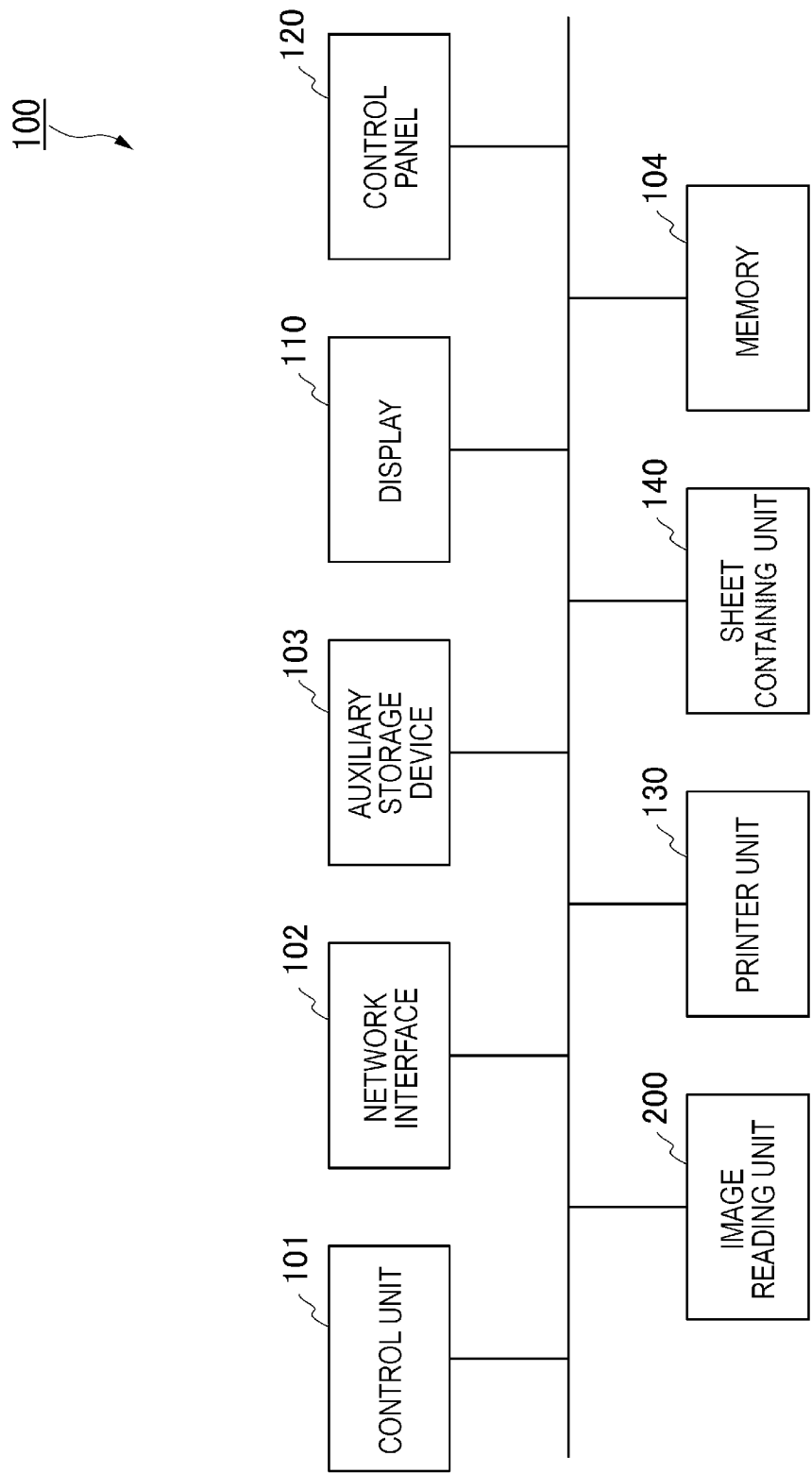
FIG. 3 is a block diagram illustrating a hardware configuration of the image forming device 100.

Next, the hardware configuration of the image forming device 100 according to the embodiment is described with reference to FIG. 3. FIG. 3 is a block diagram illustrating hardware configuration of the image forming device 100.

The image forming device 100 includes the control unit 101, a network interface 102, the auxiliary storage device 103, a memory 104, the display 110, the control panel 120, the printer unit 130, the sheet containing unit 140, and the image reading unit 200. Components included in the image forming device 100 are connected to each other via an internal bus and can transmit and receive data therebetween. In addition, the components of which functions are described with reference to FIG. 2 are denoted by the same reference numerals as in FIG. 2, and the descriptions thereof are omitted.

The control unit 101 controls the operations of the components of the image forming device 100. The control unit 101 executes programs and causes the components to perform various processes. The program is stored in advance, for example, in the memory 104 or the auxiliary storage device 103. The functional configuration of the control unit 101 is specifically described below.

The network interface 102 transmits and receives data to and from external devices. The network interface 102 operates as an output interface and transmits data to an external device. The network interface 102 operates as an input interface and receives data transmitted from the external device.

The network interface 102 is connected for communication with the delivery management device 300 and transmits and receives various kinds of information, for example, via a communication line such as the Internet and LAN. For example, the network interface 102 transmits information relating to the toner cartridge mounted on the image forming device 100 to the delivery management device 300, for example, under the control by the control unit 101.

The auxiliary storage device 103 is, for example, a storage medium such as a hard disk drive (HDD) or a solid-state drive (SSD). The auxiliary storage device 103 stores various kinds of data. The various kinds of data are information relating to the toner cartridge mounted on the image forming device 100 or the like.

The memory 104 is, for example, a storage medium such as a random access memory (RAM). The memory 104 temporarily stores data and a program used by the components included in the image forming device 100. In addition, the digital data such as image data generated by the image reading unit 200 may be a configured to be recorded in the memory 104 instead of the auxiliary storage device 103.

Hereinafter, the configuration of the control unit 101 of the image forming device 100 according to the embodiment is described. FIG. 4 is a block diagram illustrating a functional configuration of the control unit 101. The control unit 101 includes a toner removing and mounting information acquisition unit 1011, a mounting information generating unit 1012, and a mounting information transmission unit 1013.

The toner removing and mounting information acquisition unit 1011 acquires the information showing that the toner cartridge is removed and mounted and the information relating to the toner cartridge which are output from the toner mounting unit 131. The mounting information generating unit 1012 generates the mounting information based on the acquired information and stores the mounting information in the auxiliary storage device 103. The mounting information generating unit 1012 updates the mounting information stored in the auxiliary storage device 103 based on the acquired information. The mounting information is information showing which toner cartridge is mounted or has been mounted on which image forming device 100 and when. If the mounting information is generated or updated, the mounting information transmission unit 1013 transmits the corresponding mounting information to the delivery management device 300 via the network interface 102.

In addition, according to the first embodiment, the mounting information is configured to be generated and updated in each of the image forming devices 100, but the embodiment is not limited to this configuration. There may be a server device that collects information output from the toner mounting units 131 of the image forming devices 100. In this case, the server device collectively generates and updates mounting information relating to all of the image forming devices 100. Also, if the mounting information is generated or updated, the server device transmits the corresponding mounting information to the delivery management device 300 via the network interface 102.

FIG. 5 is a diagram showing an example of the mounting information. As shown in FIG. 5, the mounting information is information obtained by associating values of items of "Machine Number", "Toner ID", "mounting date", and "Removal Date" with each other.

"Machine Number" is identification information for identifying the image forming device 100 on which the toner cartridge is mounted. As described above, according to the first embodiment, the mounting information is configured to be generated and updated in each of the image forming devices 100. Therefore, according to the first embodiment, identification information for identifying the own image forming device 100 is stored in the item of "Machine Number". In the mounting information exemplified in FIG. 5, a value of "100-21" that is the identification information given to the image forming device 100-21 is recorded in the item of "Machine Number".

"Toner ID" is identification information for identifying the toner cartridge mounted on the toner mounting unit 131. In the mounting information exemplified in FIG. 5, the value of "T101000" is recorded in the item of "Toner ID".

"Mounting Date" is a date when the toner cartridge is mounted on the toner mounting unit 131. In the mounting information exemplified in FIG. 5, a value showing that the mounting date is Jul. 14, 2022 is recorded in the item of "Mounting Date".

"Removal Date" is a date when the toner cartridge is removed from the toner mounting unit 131. In the mounting information exemplified in FIG. 5, the value of the item of "Removal Date" is NULL. A case where the value of the item of "Removal Date" is NULL means that the toner cartridge is not removed from the toner mounting unit 131. That is, the value means that the toner cartridge (to which the toner ID of "T101000" is given) is still mounted on the toner mounting unit 131.

Next, the configuration of the delivery management device 300 is described. The delivery management device 300 is, for example, an information processing device such as a general-purpose computer. The delivery management device 300 is connected for communication with each of the image forming devices 100 via the network. In addition, the delivery management device 300 may be a cloud server that provides a cloud-type service, for example, on the Internet.

The delivery management device 300 is a device that manages the delivery of the toner cartridge to be mounted on the image forming device 100 per toner management group. As described above, the toner management group is obtained by grouping the plurality of image forming devices 100 used by the user. The delivery management device 300 is an example of the group management device, and the toner cartridge is an example of consumables.

FIG. 6 is a diagram illustrating a hardware configuration example of the delivery management device 300 according to the first embodiment. As illustrated in FIG. 6, the delivery management device 300 includes a control unit 301, a memory 302, an auxiliary storage device 303, a network interface 304, an input unit 305, and a display unit 306. The components included in the delivery management device 300 are connected to each other via an internal bus and can transmit and receive data therebetween.

The delivery management device 300 functions as one information processing device that provides a toner cartridge delivery management function by causing the control unit 301 to read and execute the programs stored in the auxiliary storage device 303 to the memory 302. For example, the programs described herein are programs such as BIOS, an OS, and various kinds of firmware. The control unit 301, the memory 302, and the auxiliary storage device 303 function as a control device 310.

The control device 310 takes a role as a controller that causes the delivery management device 300 to function as one information processing device that provides the toner cartridge delivery management function. In addition, the configuration of the control device 310 is not limited to a specific configuration as long as the delivery management device 300 can be caused to function as the information processing device that provides the toner cartridge delivery management function by the execution of the program.

For example, the control device 310 has a function of storing data transmitted from the image forming device 100 to the auxiliary storage device 303. In addition, the control device 310 has a function, for example, of predicting a delivery timing of the toner cartridge and outputting delivery instruction, if necessary. The control device 310 stores various kinds of setting information required for realizing these functions in the auxiliary storage device 303.

The control unit 301 is configured to include, for example, a processor such as a central processing unit (CPU). However, the control unit 301 may include, for example, other processors such as a graphics processing unit (GPU). The memory 302 is configured to include, for example, a RAM. However, the memory 302 may include, for example, other storage media such as a read only memory (ROM).

The auxiliary storage device 303 is configured by using a storage device such as a magnetic hard disk device or a semiconductor storage device. The auxiliary storage device 303 stores various kinds of information required for embodying the function of the control device 310 in advance. Specifically, the auxiliary storage device 303 stores information required by the control device 310 for predicting a delivery timing of the toner cartridge and determining necessity of the delivery of the toner cartridge. The auxiliary storage device 303 stores, for example, the mounting information transmitted from the image forming device 100.

The network interface 304 is an interface for connection for communication with an external device. The network interface 304 enables connection for communication between the delivery management device 300 and the image forming device 100. Accordingly, the delivery management device 300 can directly and indirectly transmit and receive information to and from each of the image forming devices 100.

The input unit 305 is configured with an input device such as a touch panel, a mouse, and a keyboard. The input unit 305 receives the input operation on the delivery management device 300 by the user. The input unit 305 outputs the operation signal based on the input operation to the control unit 301.

The display unit 306 is configured, for example, to include a display device such as a liquid crystal display, an organic EL display, or a cathode ray tube (CRT) display. The display unit 306 displays various kinds of information relating to the operation of the delivery management device 300. The display unit 306 displays the information based on the information output from the control unit 301. For example, the display unit 306 displays, for example, a predicted delivery timing of the toner cartridge, and a toner management group to which the toner cartridge is to be delivered.

In addition, all or a part of the functions of the delivery management device 300 may be embodied by using hardware such as an application specific integrated circuit (ASIC), a programmable logic device (PLD), or a field programmable gate array (FPGA). The program may be recorded in a computer-readable recording medium. The computer-readable recording medium is, for example, portable media such as a flexible disk, a magneto-optical disk, a ROM, and a CD-ROM, and a storage device such as a hard disk incorporated in a computer system. The program may be transmitted via an electric telecommunication line.

Figure 7:
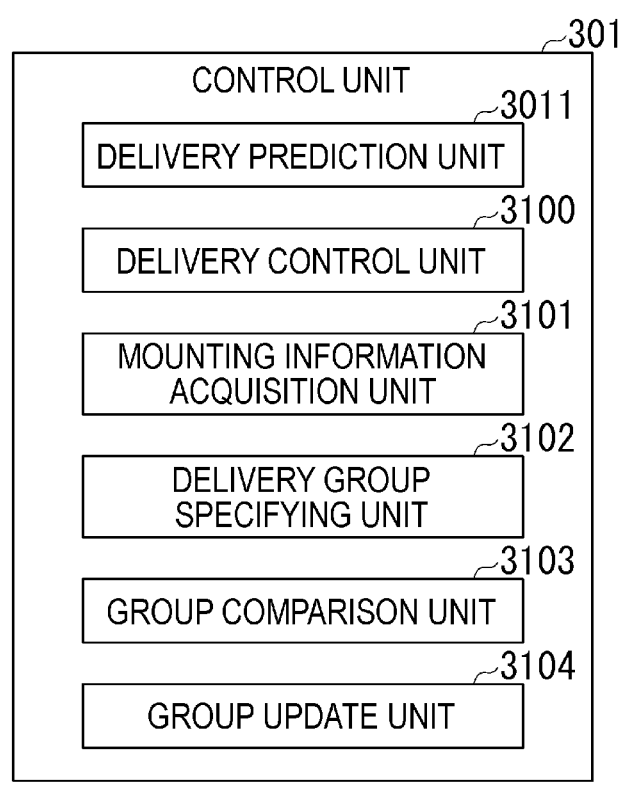
FIG. 7 is a block diagram illustrating a functional configuration of the delivery management device 300.

FIG. 7 is a block diagram illustrating a functional configuration of the delivery management device 300. As illustrated in FIG. 7, the delivery management device 300 includes a delivery prediction unit 3011, a delivery control unit 3100, a mounting information acquisition unit 3101, a delivery group specifying unit 3102, a group comparison unit 3103, and a group update unit 3104.

The delivery prediction unit 3011 specifies a toner management group predicted to require delivery of a new toner cartridge. The delivery prediction unit 3011 performs the prediction based on, for example, the number of unused toner cartridges in stock that are maintained on the user side of the image forming device 100 per toner management group. The delivery prediction unit 3011 is an example of a prediction unit. The number of unused toner cartridges in stock per toner management group is stored, for example, in the auxiliary storage device 303.

In addition, the delivery prediction unit 3011 may perform prediction based on the usage circumstance of the toner cartridge mounted on the image forming device 100. The usage circumstance of the toner cartridge is a remaining amount of the toner in the toner cartridge in use that is mounted on the image forming devices 100, a usage frequency, and the like. In this case, the information relating to the usage circumstance of the toner cartridge may be acquired at the time of prediction or may be periodically acquired by the delivery management device 300 from the image forming devices 100.

In addition, the delivery prediction unit 3011 not only predict that a new toner cartridge is required to be delivered but also predict a delivery timing. The delivery timing is a timing when a toner cartridge is required to be delivered in the future.

The delivery prediction unit 3011 outputs the identification information given to the toner management group that predicted to require delivery of a new toner cartridge, to the delivery control unit 3100. In addition, the delivery prediction unit 3011 may output the information indicating a delivery timing to the delivery control unit 3100, in addition to the identification information.

The delivery control unit 3100 acquires the identification information of the toner management group output from the delivery prediction unit 3011. In addition, the delivery control unit 3100 may further acquire the information indicating the delivery timing output from the delivery prediction unit 3011. The delivery control unit 3100 controls the delivery of a new toner cartridge based on the information acquired from the delivery prediction unit 3011.

For example, the delivery control unit 3100 transmits the identification information given to the toner management group that predicted to require delivery of a new toner cartridge to a delivery system (not illustrated). The transmission of the corresponding identification information to the delivery system is an example of a supplement instruction of consumables. The delivery system is a system for delivering a toner cartridge to a user based on the acquired identification information. In addition, the delivery control unit 3100 may transmit the identification information of the toner management group to a delivery system (not illustrated) at the delivery timing based on the information acquired from the delivery prediction unit 3011. The delivery control unit 3100 is an example of a supplement instruction unit.

In addition, for example, the delivery control unit 3100 may cause the display unit 306 to display the identification information given to the toner management group that predicted to require delivery of a new toner cartridge. In this case, for example, a person in charge of delivery of a new toner cartridge performs delivery with reference to the identification information of the toner management group displayed on the display unit 306. The display control of the corresponding identification information on the display unit 306 is an example of a supplement instruction of consumables. In addition, the delivery control unit 3100 may cause the display unit 306 to display the identification information of the toner management group at the delivery timing based on the information acquired from the delivery prediction unit 3011.

The mounting information acquisition unit 3101 acquires the mounting information transmitted from the image forming device 100. The mounting information acquisition unit 3101 stores the acquired mounting information to the auxiliary storage device 303.

The delivery group specifying unit 3102 specifies the toner ID of the mounted toner cartridge from the mounting information acquired by the mounting information acquisition unit 3101. The delivery group specifying unit 3102 specifies the identification information (hereinafter, referred to as "Group ID") of the toner management group (hereinafter, referred to as a "delivery destination toner management group") that is a delivery destination of the mounted toner cartridge based on the specified toner ID. The delivery destination toner management group is an example of a required group.

The group comparison unit 3103 specifies the machine number of the image forming device 100 mounted with the toner cartridge, from the mounting information acquired by the mounting information acquisition unit 3101. The group comparison unit 3103 specifies the group ID of a toner management group (hereinafter, referred to as a "mounting destination toner management group") to which the image forming device 100 mounted with the toner cartridge belongs, based on the specified machine number. The mounting destination toner management group is an example of the mounting group. The group comparison unit 3103 compares the group ID of the mounting destination toner management group and the group ID of the delivery destination toner management group.

If the group ID of the mounting destination toner management group (the first identification information) and the group ID of the delivery destination toner management group (the second identification information) are different from each other, the group update unit 3104 updates these two group IDs to be the same group ID. For example, the group update unit 3104 updates each of these two group IDs to be the same new group ID.

In addition, for example, the group update unit 3104 may update the group ID of the delivery destination toner management group (the second identification information) to be the same group ID as the group ID of the mounting destination toner management group (the first identification information). In addition, for example, the group update unit 3104 may update the group ID of the mounting destination toner management group (the first identification information) to be the same group ID as the group ID of the delivery destination toner management group (the second identification information).

Hereinafter, a flow of processes during the delivery prediction and the delivery of the toner cartridge by the delivery management device 300 are described with reference to specific examples. FIG. 8 is a flowchart showing an example of an operation of the delivery management device 300 according to the first embodiment. The operation of the delivery management device 300 shown by the flowchart of FIG. 8 starts, for example, periodically (for example, per one hour).

First, the delivery prediction unit 3011 of the control unit 301 performs the toner delivery prediction for specifying the toner management group predicted to require delivery of a new toner cartridge (ACT 001). Specifically, the delivery prediction unit 3011 performs prediction, for example, based on the number of unused toner cartridges in stock which are maintained on the user side of the image forming device 100 per toner management group. The delivery prediction unit 3011 specifies the number of the unused toner cartridges in stock per toner management group with reference to the intra-group toner information. The intra-group toner information is stored, for example, in the auxiliary storage device 303 and appropriately updated.

FIG. 9 is a diagram showing a specific example of the intra-group toner information. As shown in FIG. 9, the intra-group toner information is information obtained by associating values of items of "Group ID", "Type", "Color", and "Number of Unused Toners" with each other.

"Group ID" is identification information for identifying the toner management group obtained by grouping the plurality of image forming devices 100. In the intra-group toner information exemplified in FIG. 9, the values of "1001", "1002", and "1003" are recorded in the item of "Group ID". These identification numbers are, for example, identification numbers given respectively to the toner management groups 1001 to 1003 shown with broken lines in FIG. 1.

"Type" is identification information showing the format of the toner cartridge. In the intra-group toner information exemplified in FIG. 9, a value of "A" is recorded in all of the items of "Type". This means that each of the image forming devices 100 belonging to the toner management groups 1001 to 1003 are devices using a toner cartridge in a format of Type A.

"Color" is information showing a color of a toner with which the toner cartridge is filled. In the intra-group toner information exemplified in FIG. 9, a value of "black" is recorded in all of the items of "Color". This means that the image forming devices 100 belonging to the toner management groups 1001 to 1003 are devices that can form a black-and-white or grayscale image. That is, the image forming devices 100 belonging to the toner management groups 1001 to 1003 each are devices that cannot form a color image.

"Number of Unused Toners" is information showing the number of the unused toner cartridges in stock on the user side per toner management group. In the intra-group toner information exemplified in FIG. 9, for example, the value of "0" is recorded in the item of "Number of Unused Toners" for the toner management group, for example, with the group ID of "1001". This means that there is no toner cartridge in an unused state among the toner cartridges delivered to the toner management group having the group ID of "1001". In addition, in the intra-group toner information exemplified in FIG. 9, for example, a value of "1" is recorded in the item of "Number of Unused Toners" for the toner management group having the group ID of "1002". This means that there is one toner cartridge in an unused state, for example, among the toner cartridges delivered to the toner management group having the group ID of "1002".

If a delivery process of the toner cartridge is performed, 1 is added to the value of the item of "Number of Unused Toners" in the intra-group toner information. In addition, if the delivery management device 300 receives the mounting information from the image forming device 100, 1 is subtracted from the value of the corresponding item of "Number of Unused Toners".

In addition, which image forming device 100 belongs to which toner management group can be known by referring to the toner management group information. The toner management group information is stored, for example, in the auxiliary storage device 303.

FIG. 10 is a diagram showing a specific example of the toner management group information. As shown in FIG. 10, the toner management group information is information obtained by associating at least values of the items of "Machine Number" and "Group ID" with each other. The toner management group information is an example of group correspondence information. In addition, in the toner management group information, information showing the usage circumstances of the toner cartridges in the respective image forming devices 100 may be further associated.

As described above, examples of the usage circumstance of the toner cartridge includes the remaining amount of the toner in the toner cartridge in use and the usage frequency. The information relating to the usage circumstance of the toner cartridge may be acquired by the delivery management device 300 from each of the image forming devices 100 at the time of the toner delivery prediction and may be periodically acquired.

In addition, the delivery prediction unit 3011 may further predict the toner delivery with reference to the toner management group information. In this case, the delivery prediction unit 3011 predicts the toner delivery based on the usage circumstances of the toner cartridges of the respective image forming devices 100. In addition, the delivery prediction unit 3011 not only predicts that a new toner cartridge is required to be delivered but also may predict the delivery timing.

The delivery prediction unit 3011 specifies information that indicates presence or absence of the toner management group to which a new toner cartridge is required to be delivered based on the result of the toner delivery prediction (ACT 002). If it is predicted that there is no toner management group to which a new toner cartridge is required to be delivered (NO in ACT 002), an operation of the delivery management device 300 shown in the flowchart of FIG. 8 ends.

Meanwhile, if it is predicted that there is a toner management group to which a new toner cartridge is required to be delivered (YES in ACT 002), the delivery prediction unit 3011 outputs the identification information corresponding to the specified toner management group to the delivery control unit 3100. The delivery control unit 3100 performs the toner delivery process based on the identification information acquired from the delivery prediction unit 3011 (ACT 003). In addition, the toner delivery process is, for example, to transmit the corresponding identification information to a delivery system (not illustrated). Alternatively, the toner delivery process is, for example, to display the corresponding identification information on the display unit 306.

Next, the delivery control unit 3100, for example, generates the toner delivery management information (ACT 004) and stores the toner delivery management information in the auxiliary storage device 303. The toner delivery management information is information for managing the delivery process of the toner cartridge.

FIG. 11 is a diagram showing a specific example of the toner delivery management information. As shown in FIG. 11, the toner delivery management information is information obtained by associating values of the items of "Delivery Management Number", "Classification", "Request Source", "Group ID", and "State" with each other.

"Delivery Management Number" is identification information for identifying each of the toner delivery processes. In the toner delivery management information exemplified in FIG. 11, a value of "10000" is recorded in the item of "Delivery Management Number". This means that the identification information of "10000" is given to a certain toner delivery process of delivering a new toner cartridge to a user.

"Classification" is information shown a trigger for delivering a new toner cartridge to a user. In the toner delivery management information exemplified in FIG. 11, a value of "Prediction" is recorded in the item of "Classification". According to the first embodiment, the toner delivery process is performed by using the result of the toner delivery prediction by the delivery prediction unit 3011 as a trigger. Therefore, according to the first embodiment, a value of "Prediction" is stored in the item of "Classification".

"Request Source" is information showing the image forming device 100 as the request source of the new toner cartridge. In the toner delivery management information exemplified in FIG. 11, the value of the item of "Request Source" is NULL. A case where the value of the item of "Request Source" is NULL means that there is no image forming device 100 that requests the delivery of a new toner cartridge. As described above, according to the first embodiment, the toner delivery process is performed by using the result of the toner delivery prediction by the delivery prediction unit 3011 as a trigger. Therefore, there is no image forming device 100 that requests the delivery of a new toner cartridge. Accordingly, according to the first embodiment, the value of the item of "Request Source" is NULL.

"State" is information showing a progress status of the toner delivery process. In the toner delivery management information exemplified in FIG. 11, the value of "Delivery Completed" is recorded in the item of "State". This means that the delivery process of the new toner cartridge to the user is completed.

Next, the delivery control unit 3100, for example, updates the toner information stored in the auxiliary storage device 303 in advance (ACT 005). The toner information is information for managing each toner cartridge. Specifically, the delivery control unit 3100 updates the toner information so that the delivery management number is given to the identification information showing the toner cartridge delivered to the user. Accordingly, it is possible to specify which toner cartridge is delivered by which toner delivery process.

FIG. 12 is a diagram showing a specific example of the toner information. As shown in FIG. 12, the toner information is information obtained by associating the values of the items of "Toner ID", "Type", "Color", and "Delivery Management Number" with each other. "Type" is information showing a format of the toner cartridge. "Color" is information showing a color of a toner with which the toner cartridge is filled.

The toner information shown in FIG. 12 means that the toner cartridge to which the toner ID of "T101000" is given is delivered to the user. In addition, the toner information shown in FIG. 12 means that the corresponding toner cartridge is delivered by the toner delivery process to which the delivery management number of "10000" is given. In addition, the toner information shown in FIG. 12 means that the format of the corresponding toner cartridge is "Type A", and the color of the filling toner is "black".

Specifically, the delivery control unit 3100 updates the toner information, for example, so that the delivery management number of "10000" is given to the toner ID of "T101000".

Next, the delivery control unit 3100 updates, for example, the intra-group toner information that is stored in the auxiliary storage device 303 (ACT 006). As described above, the intra-group toner information is described with reference to the intra-group toner information exemplified in FIG. 9. Specifically, the delivery control unit 3100 updates the intra-group toner information so that 1 is added to the value of the number of unused toners of the toner management group that is the delivery destination of the new toner cartridge for which the delivery process is performed.

For example, the toner delivery management information exemplified in FIG. 11 shows that the toner cartridge is delivered to the toner management group to which the group ID of "1001" is given. Accordingly, the delivery control unit 3100 adds 1 to the value of the item of "Number of Unused Toners" associated with the group ID of "1001" in the intra-group toner information exemplified in FIG. 9. That is, the delivery control unit 3100 updates the value of the item of "Number of Unused Toners" from "0" to "1".

The delivery management device 300 performs the processes from ACT 003 to ACT 006 on all of the toner management groups predicted to require delivery of new toner cartridges (ACT 007). If all of the corresponding processes are completed (YES in ACT 007), the operation of the delivery management device 300 shown in the flowchart of FIG. 8 ends.

Figure 13:
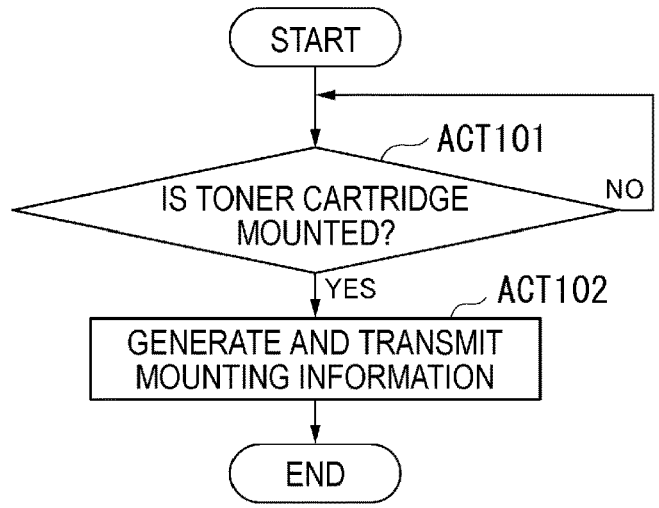
FIG. 13 is a flowchart showing an example of an operation of the image forming device 100.

Hereinafter, the flow of processes by the image forming device 100 if the toner cartridge is mounted is described with reference to the specific examples. FIG. 13 is a flowchart showing an example of the operation of the image forming device 100 according to the first embodiment. The operation of the image forming device 100 shown by the flowchart of FIG. 13 starts, for example, if the power of the image forming device 100 is turned on.

The toner removing and mounting information acquisition unit 1011 of the control unit 101 waits for the acquisition of the information output from the toner mounting unit 131 (ACT 101). The corresponding information is the information showing that the toner cartridge is mounted, and information read from the corresponding toner cartridge.

If the toner removing and mounting information acquisition unit 1011 acquires the corresponding information (YES in ACT 101), the mounting information generating unit 1012 generates the mounting information based on the acquired information. As described above, the mounting information is described with reference to the mounting information exemplified in FIG. 5.

Specifically, for example, the toner cartridge to which the toner ID of "T101000" is given is mounted to the image forming device 100-21 to which the machine number of "100-21" is given. The mounting date of this toner cartridge is, for example, Jul. 14, 2022. In this case, the mounting information as shown in FIG. 5 is generated.

The mounting information transmission unit 1013 transmits the mounting information generated by the mounting information generating unit 1012 to the delivery management device 300 via the network interface 102 (ACT 102). With the above, the operation of the image forming device 100 shown in the flowchart of FIG. 13 ends.

Figure 14:
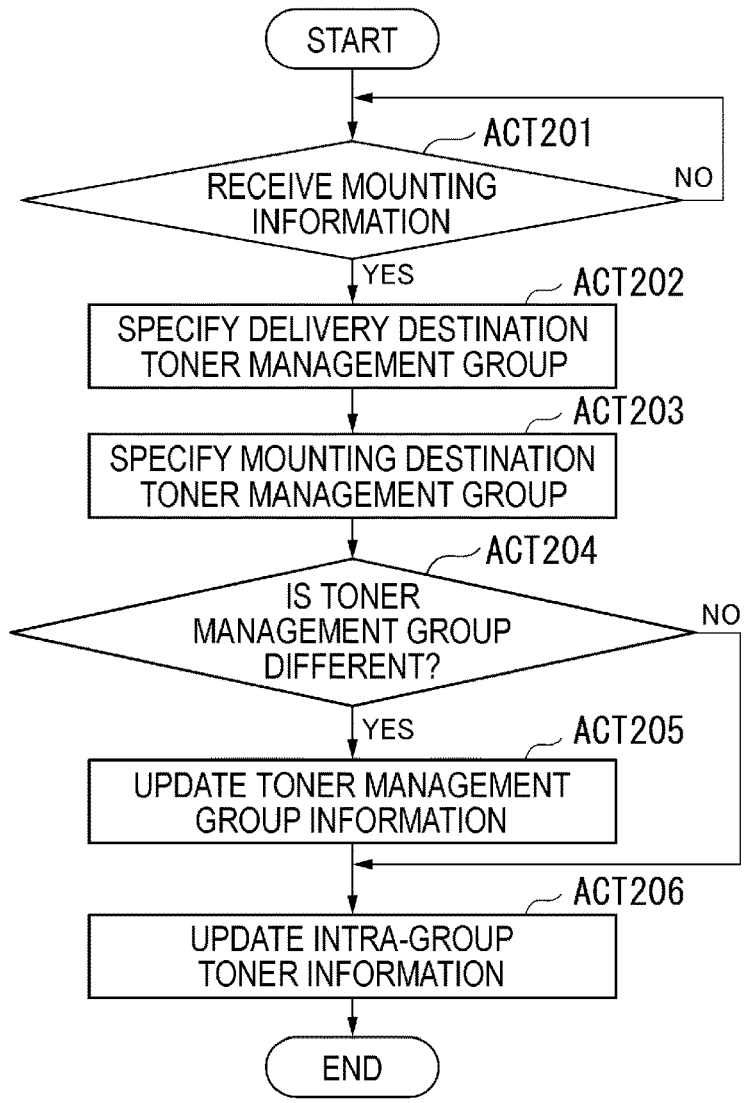
FIG. 14 is a flowchart showing an example of an operation of the delivery management device 300.

Hereinafter, the flow of the process in the management of the toner management group by the delivery management device 300 is described with reference to a specific example. FIG. 14 is a flowchart showing an example of the operation of the delivery management device 300 according to the first embodiment. The operation of the delivery management device 300 shown in the flowchart of FIG. 14 starts, for example, if the power of the delivery management device 300 is turned on.

The mounting information acquisition unit 3101 of the control unit 301 waits for the acquisition of the mounting information output from the image forming device 100 (ACT 201). If the mounting information acquisition unit 3101 acquires the mounting information (YES in ACT 201), the delivery group specifying unit 3102 specifies the toner ID of the mounted toner cartridge from the mounting information. The delivery group specifying unit 3102 refers to the toner information and specifies the delivery management number associated with the specified toner ID. The delivery group specifying unit 3102 refers to the toner delivery management information and specifies the group ID associated with the specified delivery management number. Accordingly, the delivery group specifying unit 3102 can specify the delivery destination toner management group (ACT 202).

For example, in the mounting information exemplified in FIG. 5, the value of the item of the toner ID is "T101000". The delivery group specifying unit 3102 refers to, for example, the toner information shown in FIG. 12. In the toner information shown in FIG. 12, the value of the item of the delivery management number associated with the toner ID having the value of "T101000" is "10000".

Next, the delivery group specifying unit 3102 refers to, for example, the toner delivery management information shown in FIG. 11. In toner delivery management information shown in FIG. 11, the value of the item of the group ID associated with the delivery management number of "10000" is "1001". Accordingly, the delivery group specifying unit 3102 can specify that the toner management group to which the group ID having the value of "1001" is given is the delivery destination toner management group.

Next, the group comparison unit 3103 of the control unit 301 specifies the machine number of the image forming device 100 mounted with the toner cartridge from the mounting information. The group comparison unit 3103 refers to the toner management group information and specifies the group ID associated with the specified machine number. Accordingly, the group comparison unit 3103 can specify the mounting destination toner management group (ACT 203).

For example, in the mounting information exemplified in FIG. 5, the value of the item of the machine number is "100-21". The group comparison unit 3103 refers to, for example, the toner management group information shown in FIG. 10. In the toner management group information shown in FIG. 10, the value of the item of the group ID associated with the machine number having the value of "100-21" is "1002". Accordingly, the group comparison unit 3103 can specify that the toner management group to which the group ID having the value of "1002" is given is the mounting destination toner management group.

Next, the group comparison unit 3103 compares the group ID of the specified delivery destination toner management group with the group ID of the specified mounting destination toner management group (ACT 204). As a result of the comparison, if the two group IDs are different from each other (YES in ACT 204), the group update unit 3104 updates the toner management group information (ACT 205). Specifically, the group update unit 3104 performs update such that these two group IDs are the same group ID.

Figure 15:
FIG. 15 is a diagram showing an example of an update process of the toner management group information.

FIG. 15 is a diagram showing an example of the update process of the toner management group information by the group update unit 3104. In FIG. 15, the table on the left side represents the toner management group information before update, and the table on the right side represents the toner management group information after update.

The group update unit 3104 performs the update process of combining the toner management group to which the group ID of "1001" is given and the toner management group to which the group ID of "1002" is given into one toner management group. The update process is performed because the toner cartridge delivered for the toner management group to which the group ID of "1001" is given is mounted to the image forming device 100 belonging to another toner management group. The other toner management group is the toner management group to which the group ID of "1002" is given. That is, on the user side, it is assumed that these two toner management groups may not be managed as different groups.

As shown in FIG. 15, the group update unit 3104 replaces all of "1001" and "1002" included in the values of the item of the group ID of the toner management group information into "1004". That is, the group update unit 3104 combines the two toner management groups, to be a toner management group to which "1004" which is a new group ID is given.

In addition, according to the first embodiment, the group update unit 3104 combines two toner management groups to form a new toner management group. However, the embodiment is not limited to this configuration. For example, the group update unit 3104 may replace all of "1002" included in the values of the item of the group ID of the toner management group information into "1001". That is, the group update unit 3104 may combine the toner management groups by integrating one of the two toner management groups into the other toner management group.

Next, the group update unit 3104 updates the intra-group toner information (ACT 206). Specifically, the group update unit 3104 updates these two group IDs into the same group ID. In addition, the group update unit 3104 subtracts 1 from the value of the item of the number of unused toners corresponding to the updated group ID. The subtraction is performed because the number of unused toners is reduced by one by mounting the toner cartridge.

Figure 16:
FIG. 16 is a diagram showing an example of an update process of the intra-group toner information.

FIG. 16 is a diagram showing an example of an update process of the intra-group toner information by the group update unit 3104. In FIG. 16, the table on the upper side represents the intra-group toner information before update, and the table on the lower side represents the intra-group toner information after update.

The group update unit 3104 performs the update process of combining the toner management groups on the intra-group toner information in the same manner as the update process of the toner management groups. The group update unit 3104 performs the update process of combining the toner management group to which the group ID of "1001" is given and the toner management group to which the group ID of "1002" is given into one toner management group.

As shown in FIG. 16, the group update unit 3104 combines a record in which the value of the item of the group ID of the intra-group toner information is "1001" and a record in which the value is "1002" into one record. That is, the group update unit 3104 combines the two toner management groups to form a toner management group to which "1004" that is a new group ID is given. Next, the group update unit 3104 sets the value of the item of the group ID of the combined record as "1004". Next, the group update unit 3104 subtracts 1 from "1" which is the sum of the values of the numbers of unused toners into "0". Accordingly, the table on upper side of FIG. 16 is updated to the table on the lower side.

In addition, the group update unit 3104 may combine the records of the two toner management groups to form a record of the toner management group to which "1001" is given. That is, the group update unit 3104 may combine the toner management groups by integrating one record of the two toner management groups into the other record of the toner management groups.

Meanwhile, as a result of the comparison, if the two group IDs are the same (NO in ACT 201), the group update unit 3104 updates the intra-group toner information (ACT 206). Specifically, the group update unit 3104 subtracts 1 from the value of the item of the number of unused toners corresponding to the compared group ID. The subtraction is performed because the number of unused toners is reduced by 1 by mounting the toner cartridge.

In addition, if the two group IDs are the same, the toner management group information is not updated. The update is not performed because it is assumed that there is no inconsistency between the toner management group managed in the delivery management device 300 and the toner management group that is actually managed on the user side.

With the above, the operation of the delivery management device 300 shown in the flowchart of FIG. 14 ends.

As described above, the delivery management device 300 according to the first embodiment manages the delivery of the toner cartridges to the plurality of image forming devices 100 managed per toner management group. The delivery management device 300 determines the necessity of the delivery of the new toner cartridge based on the number of unused toner cartridges in stock on the user side and the usage circumstance of the toner cartridge. In addition, the delivery management device 300 can further predict the timing when a new toner cartridge is required to be delivered.

The delivery management device 300 receives the mounting information transmitted from the image forming device 100. The delivery management device 300 specifies the mounted toner cartridge from the received mounting information. The delivery management device 300 specifies the delivery destination toner management group from the specified toner cartridge. In addition, the delivery management device 300 specifies the image forming device 100 mounted with the toner cartridge from the received mounting information. The delivery management device 300 specifies the mounting destination toner management group by specifying the toner management group belonging to the specified image forming device 100.

The delivery management device 300 compares the delivery destination toner management group with the mounting destination toner management group. If these two toner management groups are different from each other, the delivery management device 300 updates data so that the two corresponding toner management groups are managed as one toner management group.

With the delivery management device 300 according to the first embodiment which is configured in this manner, it is possible to prevent the generation of the image forming device 100 that runs out of a toner. This is because, even if the toner cartridge is mounted to the image forming device 100 belonging to the toner management group different from the intended toner management group, the two toner management groups are combined and managed thereafter.

In addition, one that the delivery management device 300 according to the first embodiment can manage is not limited to the toner cartridge. The delivery management device 300 according to the first embodiment can manage the delivery of any consumables as long as the consumables can be used in the image forming device 100. With the above, the delivery management device 300 according to the first embodiment can prevent drying up of the consumables used in the image forming device 100.

Hereinafter a second embodiment is described.

According to the first embodiment described above, the delivery management device 300 is configured to perform delivery prediction based on the number of unused toner cartridges in stock on the user side or the like. In contrast, according to the second embodiment described below, the delivery management device performs the delivery management of the toner cartridge in response to the toner cartridge delivery request transmitted from the image forming device.

Hereinafter, the multi-function peripheral system according to the second embodiment is described, but configurations different from those in the multi-function peripheral system 1 according to the first embodiment are mainly described. Among components of the multi-function peripheral system according to the second embodiment, components having the same function as the components of the multi-function peripheral system 1 according to the first embodiment are denoted by the same reference numerals, and the description thereof is omitted.

The image forming device according to the second embodiment has a configuration different from the image forming device 100 according to the first embodiment in that a control unit 151 is provided instead of the control unit 101 described above.

Figure 17:
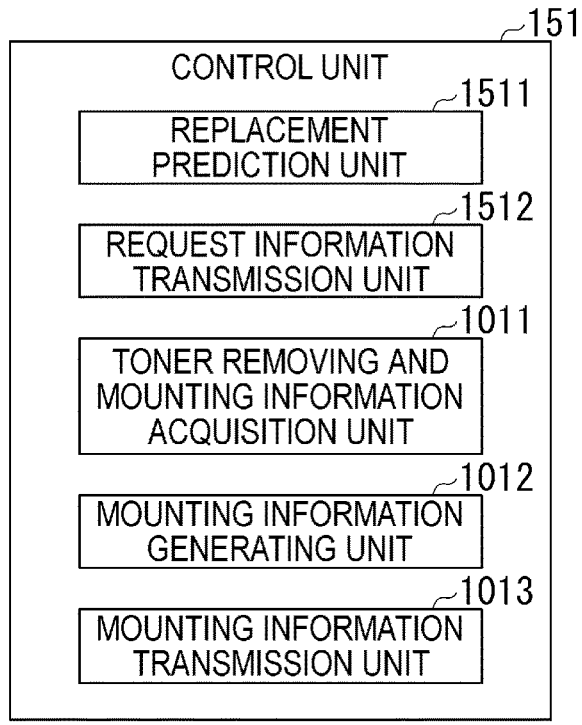
FIG. 17 is a block diagram showing a functional configuration of a control unit 151 according to a second embodiment.

FIG. 17 is a block diagram illustrating a functional configuration of the control unit 151. The control unit 151 further includes a replacement prediction unit 1511 and a request information transmission unit 1512, in addition to the toner removing and mounting information acquisition unit 1011, the mounting information generating unit 1012, and the mounting information transmission unit 1013.

The replacement prediction unit 1511 determines whether it is required to request the delivery management device for the delivery of a new toner cartridge. For example, the replacement prediction unit 1511 determines that it is required to request the delivery of the toner cartridge in response to the detection of a toner near-empty state of the own image forming device. The toner near-empty state is an example of a consumption state of consumables.

In addition, the replacement prediction unit 1511 may perform determination, for example, based on the number of unused toner cartridges in stock which are maintained for the toner management group to which the own image forming device belongs. In addition, the replacement prediction unit 1511 may perform prediction based on the usage circumstance of the toner cartridge mounted on the toner mounting unit of the own image forming device. The usage circumstance of the toner cartridge is, for example, a remaining amount and a usage frequency of the toner in the toner cartridge in use.

If it is determined by the replacement prediction unit 1511 that it is required to request the delivery of a toner cartridge, the request information transmission unit 1512 generates the request information. The request information is information showing that the delivery of a new toner cartridge from the delivery management device is requested. The request information transmission unit 1512 transmits the generated request information to the delivery management device.

The delivery management device according to the second embodiment has a configuration different from the delivery management device 300 according to the first embodiment in that a control unit 351 is provided instead of the control unit 301 described above.

Figure 18:
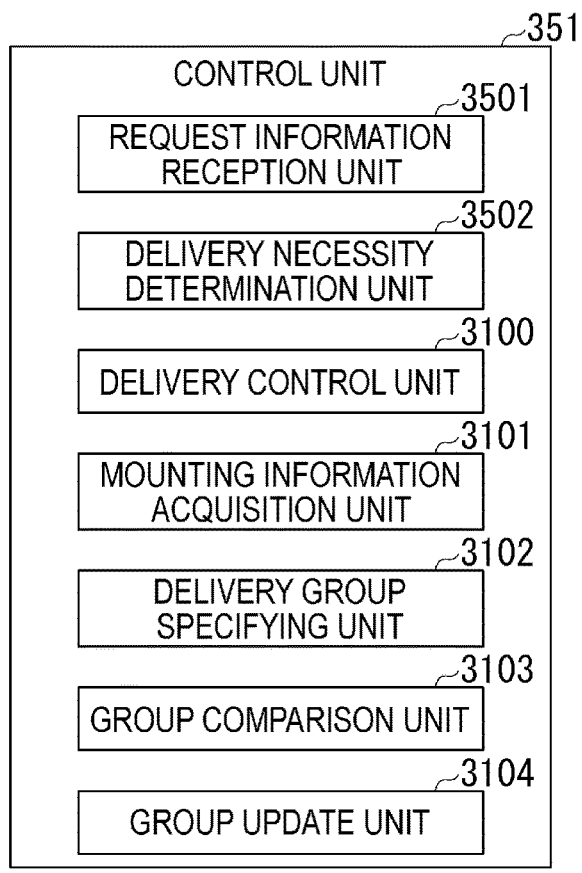
FIG. 18 is a block diagram showing a functional configuration of a control unit 351.

FIG. 18 is a block diagram showing the functional configuration of the control unit 351. The control unit 351 further includes a request information reception unit 3501 and a delivery necessity determination unit 3502 in addition to the delivery control unit 3100, the mounting information acquisition unit 3101, the delivery group specifying unit 3102, the group comparison unit 3103, and the group update unit 3104.

The request information reception unit 3501 acquires the request information transmitted from the image forming device. The request information reception unit 3501 is an example of the request information acquisition unit. The request information reception unit 3501 stores the acquired request information to the auxiliary storage device.

The delivery necessity determination unit 3502 determines the necessity of the delivery of the toner cartridge based on the request information acquired by the request information reception unit 3501. For example, the delivery necessity determination unit 3502 specifies the group ID of the toner management group requesting the delivery of the toner cartridge, based on the machine number of the image forming device included in the request information.

The delivery necessity determination unit 3502 performs determination, for example, based on the number of the unused toner cartridges in stock which are maintained on the user side of the image forming device per toner management group. The number of the unused toner cartridges in stock per toner management group is stored, for example, in the auxiliary storage device.

In addition, the delivery necessity determination unit 3502 may perform determination based on the usage circumstance of the toner cartridge mounted on the image forming device. Examples of the usage circumstance of the toner cartridge include a remaining amount of the toner in the toner cartridge in use and a usage frequency. In this case, the information relating to the usage circumstance of the toner cartridge may be acquired from each of the image forming devices at the time of determination or may be periodically acquired.

In addition, the delivery necessity determination unit 3502 not only determines whether a new toner cartridge is required to be delivered but also may determine a delivery timing. The delivery timing is a timing when a toner cartridge is required to be delivered in the future.

The delivery necessity determination unit 3502 outputs the group ID of the toner management group determined to require delivery of a new toner cartridge, to the delivery control unit 3100. In addition, the delivery necessity determination unit 3502 may output the information showing the delivery timing to the delivery control unit 3100 in addition to the group ID.

In addition, a process of determining the necessity of the delivery of the toner cartridge by the delivery necessity determination unit 3502 may be omitted. That is, the delivery management device may necessarily instruct the delivery of the toner cartridge in response to the request information without determining the necessity of the delivery of the toner cartridge. In this case, the delivery necessity determination unit 3502 outputs the group ID of the specified toner management group based on the acquired request information to the delivery control unit 3100, as it is.

Hereinafter, the flow of the process if the request information is transmitted by the image forming device is described with reference to the specific example. FIG. 19 is a flowchart showing an example of the operation of the image forming device according to the second embodiment. The operation of the image forming device shown in the flowchart of FIG. 19 starts, for example, periodically (for example, per one hour).

The replacement prediction unit 1511 of the control unit 151 detects whether the own image forming device is in the toner near-empty state (ACT 301). If it is determined by the replacement prediction unit 1511 (ACT 302) that the own image forming device is in the toner near-empty state, the request information transmission unit 1512 generates (ACT 303) the request information. The request information transmission unit 1512 transmits the generated request information to the delivery management device (ACT 304).

FIG. 20 is a diagram showing an example of the request information. As shown in FIG. 20, the request information is information obtained by associating the values of the items of "Machine Number", "Type", and "Color".

"Machine Number" is identification information for identifying the image forming device requesting the delivery of a new toner cartridge. In the mounting information exemplified in FIG. 20, the value of "100-21" that is the identification information given to the image forming device 100-21 is recorded in the item of "Machine Number".

"Type" is identification information showing the format of the toner cartridge. In the request information exemplified in FIG. 20, the value of "A" is recorded in the item of "Type". The value means that the image forming device 100-21 is a device using the toner cartridge in the format of Type A.

"Color" is information showing the color of the toner contained the toner cartridge. In the request information exemplified in FIG. 20, the value of "black" is recorded in the item of "Color". The value means that the image forming device 100-21 is a device that can form a black-and-white or grayscale image. That is, the value means that the image forming device 100-21 is a device that does not form a color image.

Hereinafter, the delivery prediction of the toner cartridge and the flow of the process during the delivery by the delivery management device according to the second embodiment are described with reference to specific examples. FIG. 21 is a flowchart showing an example of the operation of the delivery management device according to the second embodiment. The operation of the delivery management device shown in the flowchart of FIG. 21 starts, for example, if the power of the delivery management device is turned on.

The request information reception unit 3501 of the control unit 351 waits for the reception of the request information transmitted from the image forming device (ACT 401). If the request information reception unit 3501 receives the request information (YES in ACT 401), the delivery necessity determination unit 3502 specifies the image forming device as the request source from the request information acquired by the request information reception unit 3501. The delivery necessity determination unit 3502 refers to the toner management group information and specifies the toner management group to which the specified image forming device belongs (ACT 402).

For example, the delivery necessity determination unit 3502 reads "100-21" that is the value of the item of the machine number from the request information shown in FIG. 20. Accordingly, the delivery necessity determination unit 3502 can specify that the image forming device as the request source is the image forming device 100-21 to which the machine number having the value of "100-21" is given. Next, the delivery necessity determination unit 3502 refers to the toner management group information shown in FIG. 10 and specifies the value of the item of the group ID corresponding to the machine number having the value of "100-21".

Accordingly, the delivery necessity determination unit 3502 can specify that the toner management group of the request source is the toner management group to which the group ID having the value of "1002" is given.

The delivery necessity determination unit 3502 of the control unit 301 determines whether a new toner cartridge is required to be delivered to the specified toner management group of the request source (ACT 403).

Specifically, the delivery necessity determination unit 3502 perform determination, for example, based on the number of unused toner cartridges in stock which is maintained for the toner management group to which the group ID of "1002" is given on the user side. The delivery necessity determination unit 3502 specifies the number of unused toner cartridges in stock for the corresponding toner management group by referring to the intra-group toner information. For example, the delivery necessity determination unit 3502 refers to the intra-group toner information shown in FIG. 9 and specifies the number of unused toner cartridges in stock.

If it is determined that a new toner cartridge is not required to be delivered to the toner management group of the request source (NO in ACT 403), the operation of the delivery management device shown in the flowchart of FIG. 21 ends.

Meanwhile, if it is predicted that a new toner cartridge is required to be delivered to the toner management group of the request source (YES in ACT 403), the delivery necessity determination unit 3502 outputs the group ID of the toner management group of the request source to the delivery control unit 3100. The delivery control unit 3100 performs the toner delivery process based on the group ID acquired from the delivery prediction unit 3011 (ACT 404). In addition, the toner delivery process transmits, for example, the corresponding identification information to the delivery system (not illustrated). In addition, the toner delivery process is, for example, to display the corresponding group ID to the display unit.

Next, the delivery control unit 3100 generates the toner delivery management information and stores the toner delivery management information, for example, in the auxiliary storage device (ACT 405). The toner delivery management information is information for managing the delivery process of the toner cartridge.

FIG. 22 is a diagram showing a specific example of the toner delivery management information according to the second embodiment. As shown in FIG. 22, the toner delivery management information is information obtained by associating the values of the items of "Delivery Management Number", "Classification", "Request Source", "Group ID", and "State". In this manner, the item included in the toner delivery management information is the same as the first embodiment.

"Delivery Management Number" is the identification information for identifying each of the toner delivery processes. In the toner delivery management information exemplified in FIG. 22, the value of "10000" is recorded in the item of "Delivery Management Number". This means that the identification information of "10000" is given to the toner delivery process in which a new toner cartridge is delivered to the user.

"Classification" is information showing a trigger for delivering a new toner cartridge to the user. In the toner delivery management information exemplified in FIG. 22, the value of "Request" is recorded in the item of "Classification". According to the second embodiment, the toner delivery process is performed by using the request from the image forming device as a trigger. Therefore, according to the second embodiment, the value of "Request" is recorded in the item of "Classification".

"Request Source" is information indicating the toner management group of the request source of the new toner cartridge. In the toner delivery management information exemplified in FIG. 22, the value of "100-21" is recorded in the item of "Request Source". The value means the toner delivery process performed in response to the request from the image forming device 100-21 to which the machine number of "100-21" is given.

"State" is information showing the progress status of the toner delivery process. In the toner delivery management information exemplified in FIG. 22, the value of "Delivery Completed" is recorded in the item of "State". This means that the delivery process of the new toner cartridge to the user is completed.

Next, the delivery control unit 3100 updates the toner information, for example, stored in the auxiliary storage device in advance (ACT 406). Specifically, the delivery control unit 3100 performs an update of giving the delivery management number to the toner ID given to the toner cartridge delivered to the user. Accordingly, it is possible to specify which toner cartridge is delivered by which toner delivery process.

The toner information shown in FIG. 12 means that the toner cartridge to which the toner ID of "T101000" is given is delivered to the user. In addition, the toner information shown in FIG. 12 means that the corresponding toner cartridge is delivered by the toner delivery process to which the delivery management number of "10000" is given. Specifically, the delivery control unit 3100 updates the toner information, for example, so that the delivery management number of "10000" is given to the toner ID of "T101000".

Next, the delivery control unit 3100 updates the intra-group toner information stored, for example, in the auxiliary storage device (ACT 407). Specifically, the delivery control unit 3100 updates the intra-group toner information so that 1 is added to the value of the number of unused toners of the toner management group that is the delivery destination of the new toner cartridge for which the delivery process is performed.

For example, the toner delivery management information exemplified in FIG. 22 shows that the toner cartridge is delivered to the toner management group to which the group ID of "1001" is given. Accordingly, the delivery control unit 3100 adds 1 to the value of the item of "Number of Unused Toners" associated with the group ID of "1001" in the intra-group toner information exemplified in FIG. 9. That is, the delivery control unit 3100 updates the value of the item of "Number of Unused Toners" from "0" to "1".

With the above, the operation of the delivery management device shown in the flowchart of FIG. 21 ends.

In addition, the flow of the process in the management of the toner management group by the delivery management device according to the second embodiment is the same as the flow of the process according to the first embodiment which is described with reference to FIG. 14. That is, the delivery management device according to the second embodiment compares the delivery destination toner management group with the mounting destination toner management group. If these two toner management groups are different from each other, the delivery management device updates data so that the corresponding two toner management groups are managed as one toner management group.

As described above, the delivery management device according to the second embodiment manages the delivery of the toner cartridge to the plurality of image forming devices managed per toner management group. The delivery management device determines the necessity of the delivery of the new toner cartridge based on the request information transmitted from the image forming device. In addition, the delivery management device can further predict a timing when a new toner cartridge is required to be delivered.

The delivery management device receives the mounting information transmitted from the image forming device. The delivery management device specifies the mounted toner cartridge from the received mounting information. The delivery management device specifies the delivery destination toner management group from the specified toner cartridge. In addition, the delivery management device specifies the image forming device to which the toner cartridge is mounted from the received mounting information. The delivery management device specifies the mounting destination toner management group by specifying the toner management group to which the specified image forming device belongs.

The delivery management device compares the delivery destination toner management group with the mounting destination toner management group. If these two toner management groups are different from each other, the delivery management device updates the data so that the corresponding two toner management groups are managed as one toner management group.

With the delivery management device 300 according to the second embodiment configured in this manner, the generation of the image forming device that runs out of a toner can be prevented. This is because, even if the toner cartridge is mounted to the image forming device belonging to the toner management group different from the intended toner management group, these two toner management groups are combined and managed thereafter.

In addition, one that the delivery management device according to the second embodiment can manage is not limited to the toner cartridge. The delivery management device according to the second embodiment can manage the delivery of any consumables, as long as the consumables are used in the image forming device. With the above, the delivery management device according to the second embodiment can prevent drying up of the consumables used in the image forming device.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A group management device, comprising:
   a processor configured to:
   receive information showing required groups determined to require supplements of consumables used in image forming devices that are managed per group;
   perform a supplement instruction of the consumables for the required groups;
   receive mounting information showing an image forming device to which the consumable supplemented in response to the supplement instruction is mounted;
   specify a mounting group to which the image forming device mounted with the consumable belongs based on group correspondence information obtained by associating the image forming device and the mounting group, and the mounting information, and update the group correspondence information if the required group and the mounting group are different from each other; and
   perform an update so that first identification information given to the mounting group and second identification information to the required group are the same identification information, wherein the same identification information is identification information different from the first identification information and the second identification information.

2. The group management device according to claim 1, wherein the same identification information is any one of the first identification information and the second identification information.

3. The group management device according to claim 1, wherein the processor is further configured to:
   predict necessity of a supplement of the consumable per group and generates information showing the required group, and
   receive information showing the required group.

4. The group management device according to claim 3, wherein the processor is further configured to predict necessity of the supplement based on at least one of a number of unused consumables in stock per group and a usage circumstance of the consumable which is mounted to the image forming device.

5. The group management device according to claim 1, wherein the processor is further configured to:
   receive request information designating the image forming device that requests the supplement of the consumable, and
   receive information showing the required group by specifying a group to which the image forming device designated by the request information belongs based on the group correspondence information and the request information.

6. The group management device according to claim 5, wherein the request information is generated based on information showing a state of consumption of the consumable obtained in the image forming device.

7. The group management device according to claim 1, wherein the consumable is a toner cartridge.

8. The group management device according to claim 1, wherein the consumable is an ink cartridge.

9. A group management method, comprising:
   receiving information showing required groups that are groups determined to require supplements of the consumables used in image forming devices that are managed per group and;
   performing a supplement instruction of the consumables for the required groups;
   receiving mounting information showing an image forming device mounted with the consumable supplemented in response to the supplement instruction;
   specifying a mounting group to which the image forming device mounted with the consumable belongs based on group correspondence information obtained by associating the image forming device and the mounting group, and the mounting information, and updates the group correspondence information if the required group and the mounting group are different from each other; and
   performing an update so that first identification information given to the mounting group and second identification information given to the required group are the same identification information, wherein the same identification information is identification information different from the first identification information and the second identification information.

10. The group management method according to claim 9, further comprising:
    wherein the same identification information is any one of the first identification information and the second identification information.

11. The group management method according to claim 9, further comprising:
    predicting necessity of a supplement of the consumable per group;
    generating information showing the required group; and
    receiving information showing the required groups generated.

12. The group management method according to claim 11, further comprising:
    predicting necessity of the supplement based on at least one of a number of unused consumables in stock per group and a usage circumstance of the consumable which is mounted to the image forming device.

13. The group management method according to claim 9, further comprising:
    receiving request information designating the image forming device that requests the supplement of the consumable; and
    receiving information showing the required group by specifying a group to which the image forming device designated by the request information belongs based on the group correspondence information and the request information.

14. The group management method according to claim 13, further comprising:

generating the request information based on information showing a state of consumption of the consumable obtained in the image forming device.

15. The group management method according to claim 9, wherein the consumable is a toner cartridge.

16. The group management method according to claim 9, wherein the consumable is an ink cartridge.

* * * * *